(12) United States Patent
Feidner

(10) Patent No.: US 7,005,569 B2
(45) Date of Patent: Feb. 28, 2006

(54) METHOD FOR IMPARTING MUSIC SCORE READING AND KEYBOARD PERFORMANCE SKILLS

(76) Inventor: Erica Vanderlinde Feidner, 3 Carlton Dr., Mount Kisco, NY (US) 10549

( * ) Notice: Subject to any disclaimer, the term of this patent is extended or adjusted under 35 U.S.C. 154(b) by 0 days.

(21) Appl. No.: 10/413,848

(22) Filed: Apr. 14, 2003

(65) Prior Publication Data

US 2004/0003704 A1    Jan. 8, 2004

Related U.S. Application Data

(60) Provisional application No. 60/372,779, filed on Apr. 15, 2002.

(51) Int. Cl.
  *G09B 15/08* (2006.01)
(52) U.S. Cl. ......................................... 84/478; 434/227
(58) Field of Classification Search .................. 84/478, 84/477 R, 479 R, 479 A, 483.1, 483.2, 485 R, 84/470 R; 434/227, 176, 202, 231; 984/256
See application file for complete search history.

(56) References Cited

U.S. PATENT DOCUMENTS 1,844,976 A  *  2/1932  Rantz ........................... 84/478
5,574,238 A  *  11/1996 Mencher ..................... 84/483.2

* cited by examiner

*Primary Examiner*—David Martin
*Assistant Examiner*—Jianchun Qin
(74) *Attorney, Agent, or Firm*—Dickstein, Shapiro, Morin & Oshinsky, LLP.

(57) ABSTRACT

A method is provided which facilitates for players the learning of music reading in the playing of keyboard instruments, which comprises the steps of providing a plurality of musical staves, musical notes, and letters of the alphabet corresponding to the musical notes; and causing the player to play sequentially pairs of musical notes by striking corresponding keys on the keyboard.

1 Claim, 10 Drawing Sheets

PRIOR ART

INTERVAL:

INTERVAL:

INTERVAL:

INTERVAL:

METHOD FOR IMPARTING MUSIC SCORE READING AND KEYBOARD PERFORMANCE SKILLS

This application claims the benefit of Provisional Application No. 60/372,779, filed Apr. 15, 2002.

TECHNICAL FIELD

The present invention relates to the science of teaching music score reading in conjunction with the playing of musical instruments. More particularly, my invention relates to an efficient method of imparting the rudiments of music score reading and the application of same to keyboard instrument playing.

BACKGROUND ART

Keyboard musical instruments generally have a surface comprising keys each corresponding to a musical note or tone and which are pressed or otherwise actuated in order to sound or "play" the notes assigned to the respective keys. Such instruments produce sounds in various ways and are embodied in such well known keyboard instruments as pianos, organs, harpsichords, synthesizers (digital keyboards), and accordions. Many keyboard instruments, known as chordophones, further comprise tensioned strings or wires corresponding to the keys such that when a key is actuated, a corresponding string is either plucked or struck to impart mechanical (vibrational) energy to the string. The energy in the string is transferred, usually via a transducer (e.g., a "bridge"), to a vibratable member (i.e., a soundboard) capable of generating an audible sound of a corresponding predetermined fundamental pitch together with corresponding overtones and or harmonics which give the sound produced a characteristic quality or timber. Each key in a piano, for example, has a hammer associated with it which strikes a corresponding string when the key is depressed. In a harpsichord, the back of the key is fitted with a vertical jack which carries a pick or plectrum. Depressing the key releases a cloth damper from the string, raises the jack and forces the plectrum past and in contact with the string, thereby plucking it.

As used herein, a "key" is intended broadly to mean all types of levers including conventional piano keys, as well as other actuation devices. The term "conventional piano key" means piano keys generally of the shapes of the "white" and "black" keys shown in FIG. 1. White key 1 is a conventional C piano key. It is rectangular with a rabbet on the upper, right side which accommodates placement of the conventional C♯/D♭ piano key 8. White key 2 is a conventional D piano key. It is rectangular with a first rabbet on the upper left side to accommodate placement of the key 8 and a second rabbet on the upper right side to accommodate placement of the conventional D♯/E♭ piano key 9. Black keys 8 and 9 are rectangular and shorter than the white keys, and narrower than the lower portion of each white key.

Referring to FIG. 1, which shows part of a keyboard of the type found on most pianos, harpsichords, synthesizers and accordions, the white keys and black keys, when pressed, produces corresponding tones. The white keys include, in addition to those previously discussed, an E key 3, an F key 4, a G key 5, an A key 6 and a B key 7. The black keys include, in addition to those previously discussed, an F♯/G♭ key 10, a G♯/A♭ key 11, and an A♯/B♭ key 12. Piano keys numbered on FIG. 1 as 1 through 12 constitute an "octave".

Also shown in FIG. 1 is a second grouping of keys which correspond to the next, higher octave. This second octave includes, as white keys, a C key 21, a D key 22, an E key 23, an F key 24, a G key 25, an A key 26 and a B key 27. The black keys included in the second octave are a C♯/D♭ key 28, a D♯/E♭ key 29, an F♯/G♭ key 30, a G♯/A♭ key 31, and an A♯/B♭ key 32. C key 1, for example, is one octave lower than C key 21.

It is important to distinguish the meanings of "note" and "pitch." For example, key 1 and key 21 play the same "note", i.e., a "C". However, these same two keys play tones of different "pitches" because the two keys correspond to tones that are an octave apart.

Furthermore, the term "half-step" in the context of the keyboard of FIG. 1, means one key to the right or left. For example, the B key 7 is a half-step to the left of C key 21 and a half-step to the right of A♯/B♭ key 12. As another example, the D♯/E♭ key 29 is one half-step to the right of D key 22 and a half-step to the left of E key 23. A "whole step" constitutes two consecutive half steps. Thus, C key 1 is a whole step to the left of D key 2, because C♯/D♭ key 8 is between said C and D keys.

A feature common to all keyboard instruments is that each of the keys has an associated playing surface visible to the person playing the instrument. The top of a piano key, for example, is an associated playing surface which is visible to the pianist. The tops of the black keys usually lie in a plane above the plane defined by the playing surfaces of the white keys.

A problem associated with conventional approaches to the teaching of reading of music (musical scores) and applying what one reads simultaneously to musical instruments, and to the keyboard in particular, is that the teaching of it at the elementary level has been focused on the recognition and naming of notes in a discrete manner as opposed to correlating keys with intervals on a musical score. This fails to impart an understanding in the mind of the beginning student of their tonal relationships which in turn hinders development of the student's musical "ear", particularly with regard to recognizing the relative pitches of the notes in an interval. Thus, in conventional keyboard pedagogical methodologies for teaching beginners, one initially learns music notation (including clefs and signatures), the location of each musical note on the instrument, a variety of musical scales, modalities, and chords, and the theory that ties all of these together in the naming of notes rather than intuitive placement of the beginning player's fingers on the keys. For example, the beginner student typically learns most or all of the major and minor scales, as well as many different chords. Memorizing or quickly identifying such notes, scales and chords can be a more difficult task than it should be, particularly for the beginner and does not provide the beginner with the means to develop at the requisite early stage an intuitive sense as to how the various notes, chords and/or scales relate to each other. As a result, the conventional reference techniques frequently do little to advance an understanding of music theory.

SUMMARY OF THE INVENTION

Recognizing that conventional teaching methods for beginning keyboard students are essentially note/scale (alphabetical) memorization-driven processes which tends to obscure the path toward proper musical development to the point where such methods seem chaotic and illogical, the solution to the problem according to my invention as it applies to keyboard playing is a method for teaching beginners, the instructional basis of which is grounded upon the development of an understanding of the correlation between the keys in terms of tone intervals represented by the lines and spaces of the musical staffs, and appreciation of the relation between such intervals and the notes which define them (distance) and the progression of melodic flow (direction).

DESCRIPTION OF THE PREFERRED EMBODIMENTS

Figure 1:
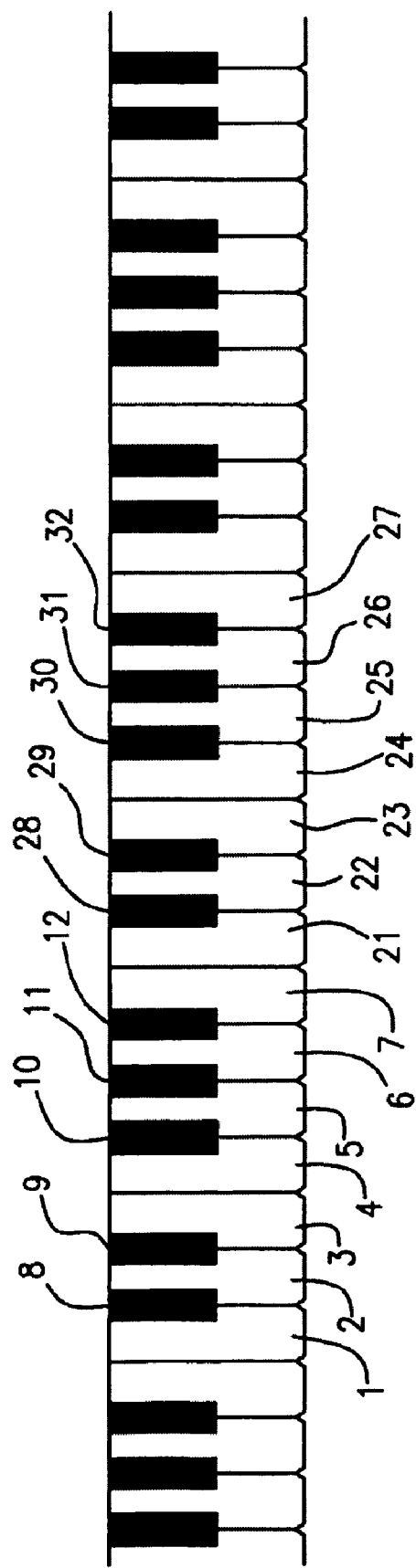
FIG. 1 shows a portion of a musical keyboard, as described hereinabove.
Figure 2:
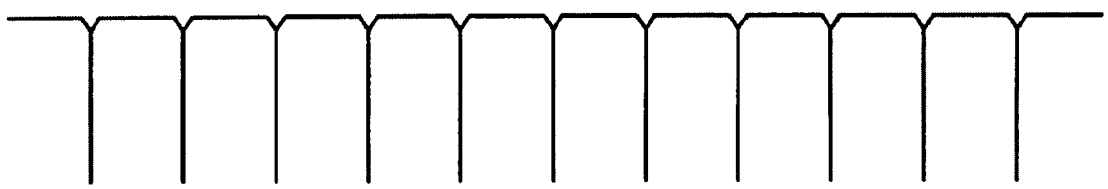
FIG. 2 shows the white keys of the keyboard of FIG. 1.
Figure 3:
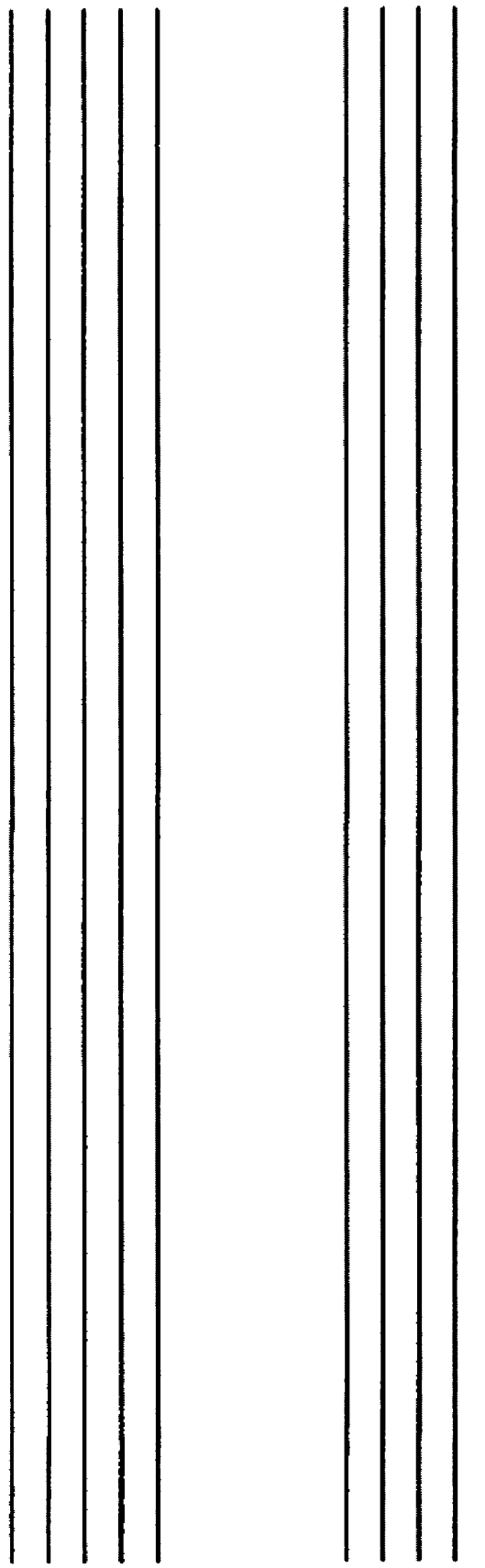
FIG. 3 shows the lines and spaces constituting a grand staff used in writing musical scores.
Figure 4:
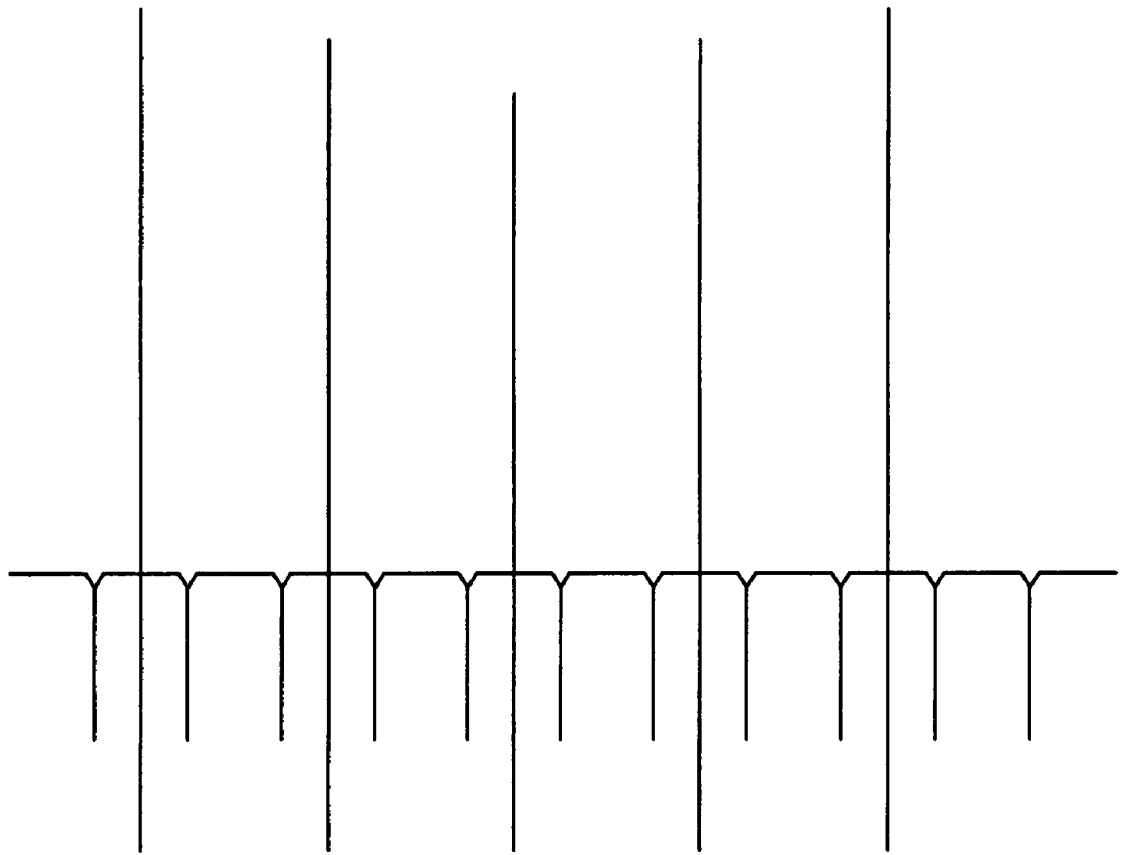
FIG. 4 shows the superposition of a portion of the staff of FIG. 3 onto the white keys of FIG. 2.
Figure 5:
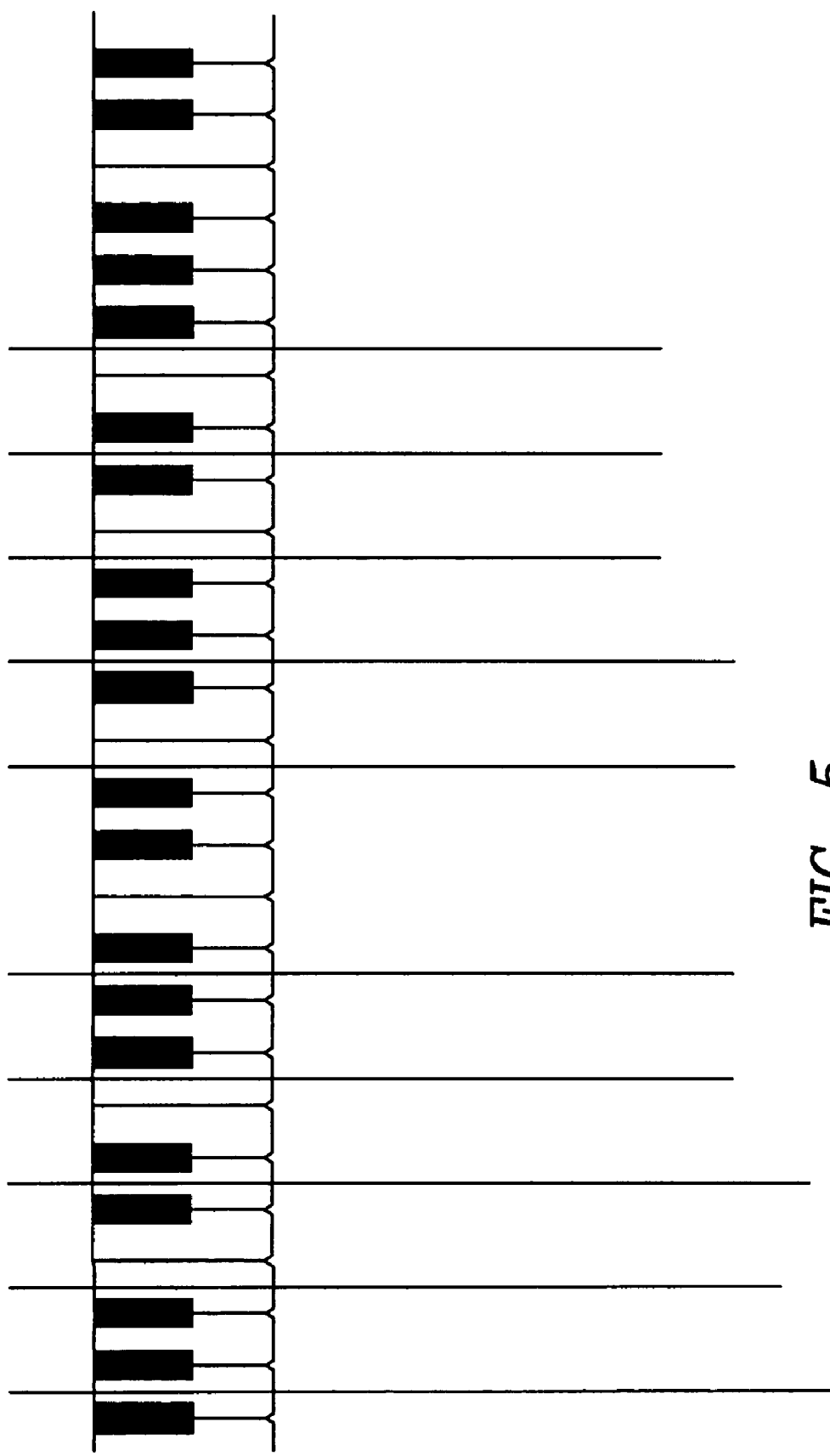
FIG. 5 shows the superposition of the black keys of the keyboard of FIG. 1 onto the white keys shown in FIG. 4.
Figure 6:
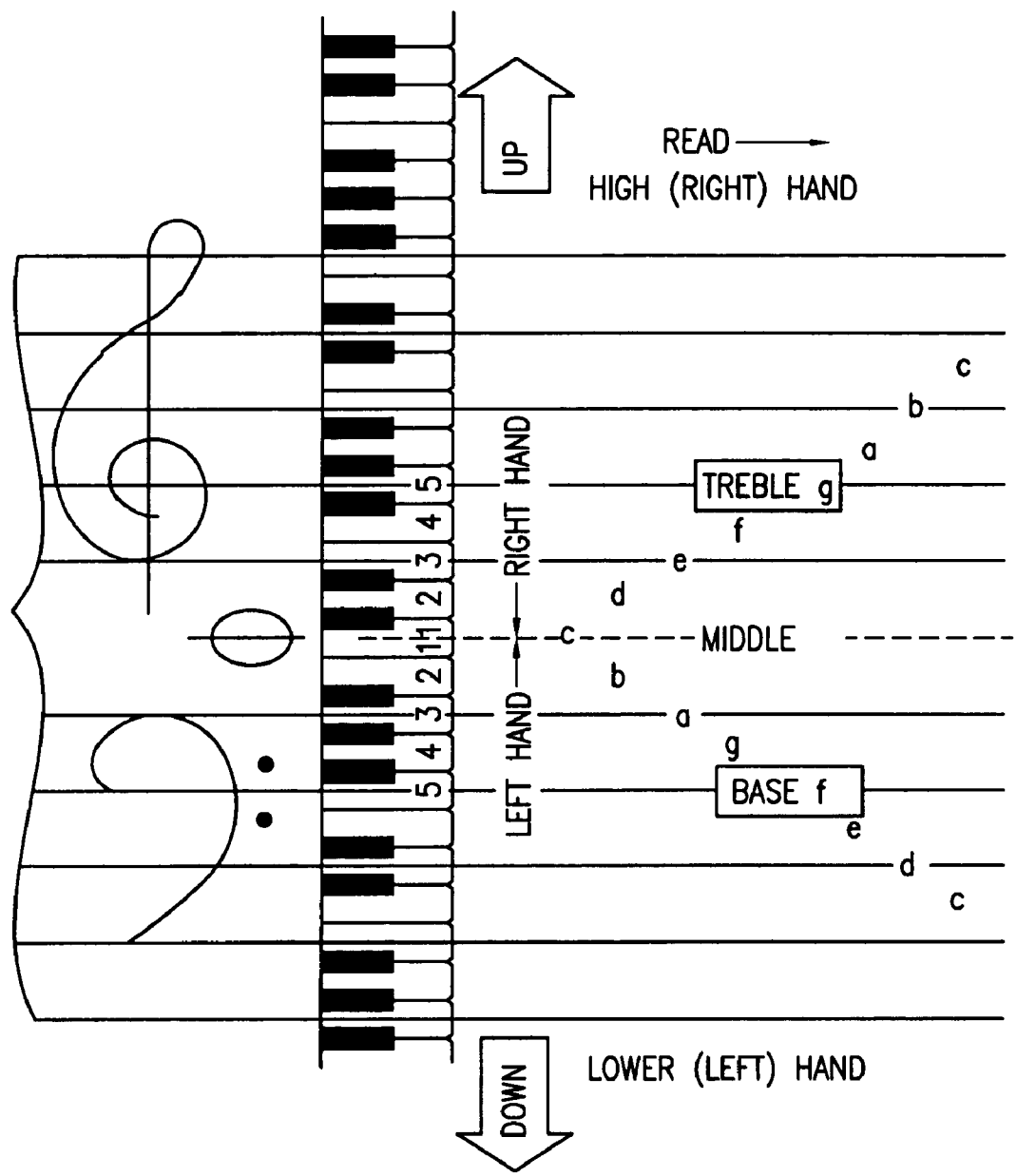
FIG. 6 shows the relationship between the notes of the keyboard of FIG. 1 and the notes assigned to the horizontal lines and spaces on a grand staff of the type conventionally used in teaching keyboard playing.
Figure 7:
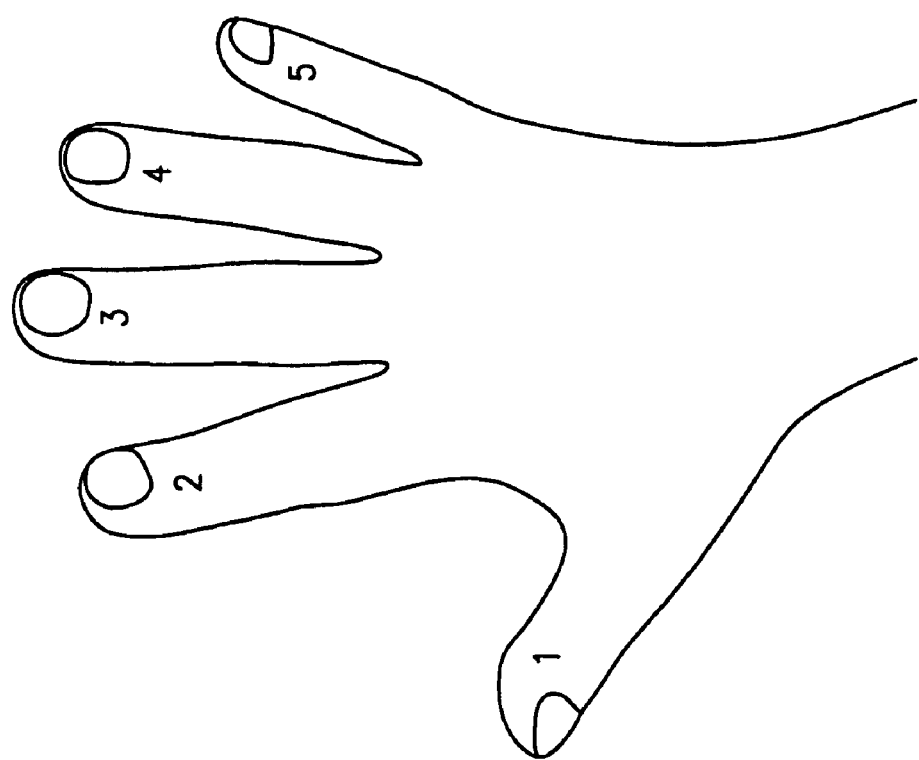
FIG. 7 shows the relationship between the fingers of a student's hands and the intervals on the keyboard (e.g., seconds, thirds, fourths and fifths).
Figure 7:
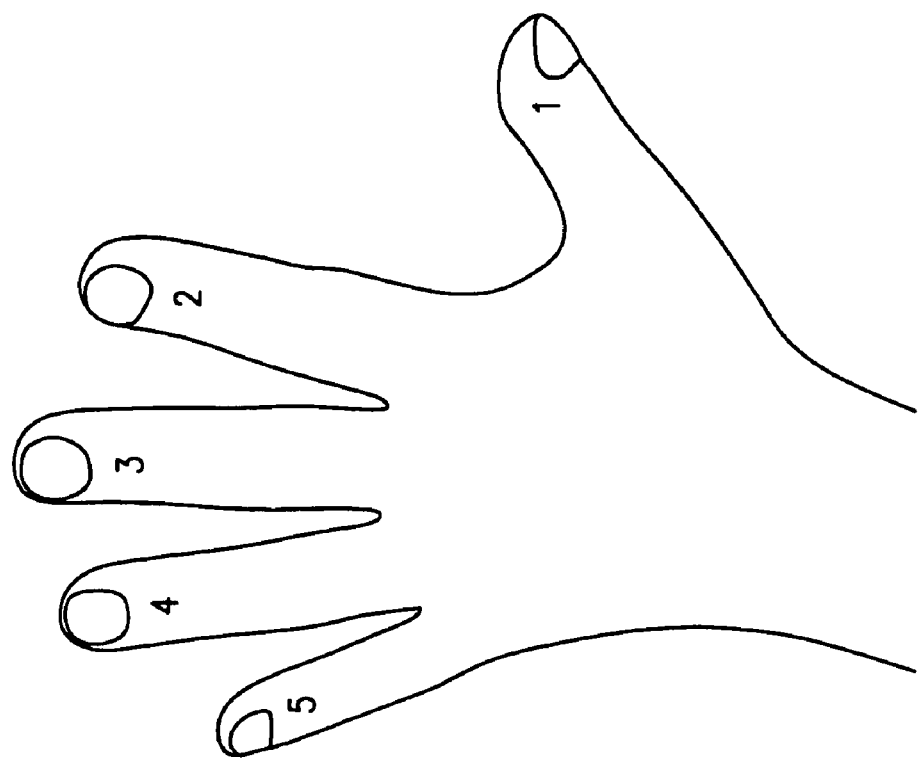
Figure 8:
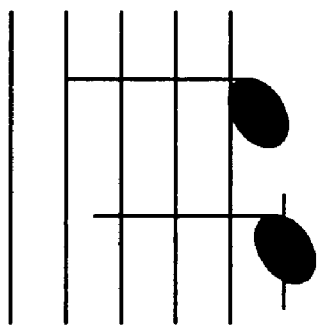
FIG. 8 shows the special relationship between the white keys on a keyboard with the musical notation corresponding to the interval of a "second" on a musical score.
Figure 8:
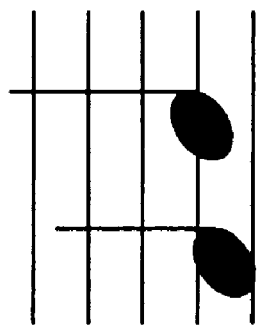
Figure 8:
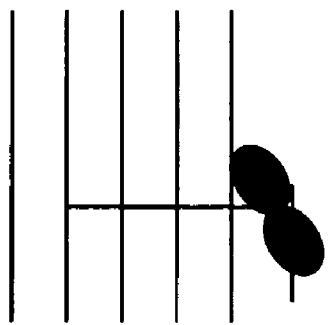
Figure 8:
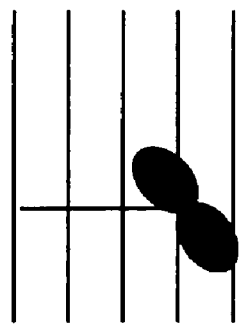
Figure 8:
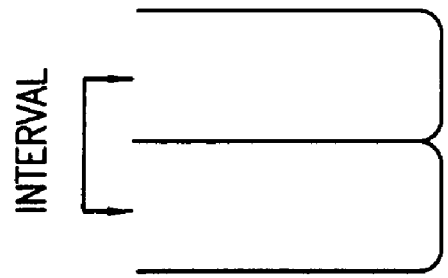
Figure 9:
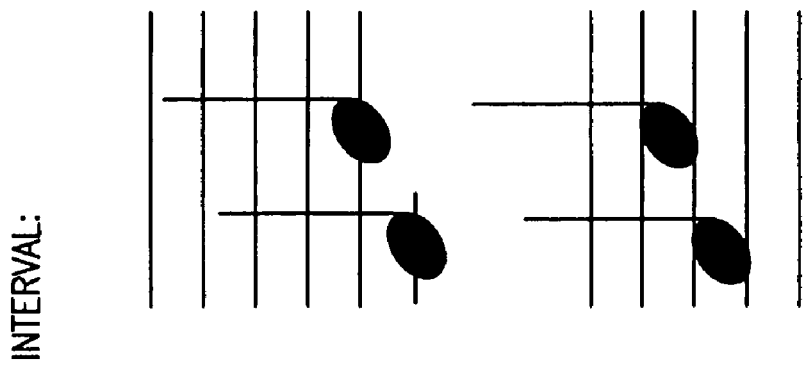
FIG. 9 shows the special relationship between the white keys on a keyboard with the musical notation corresponding to the interval of a "third" on a musical score.
Figure 9:
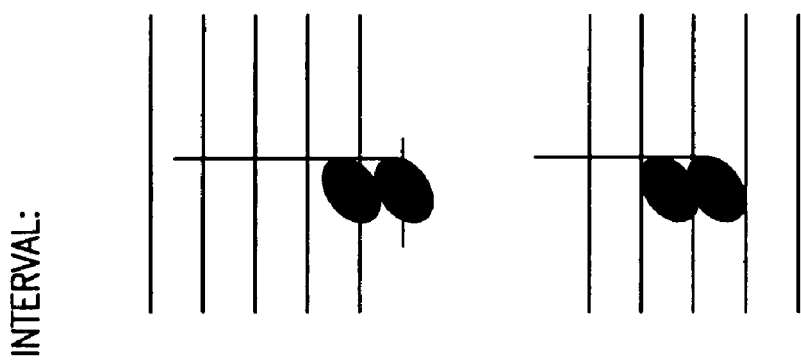
Figure 9:
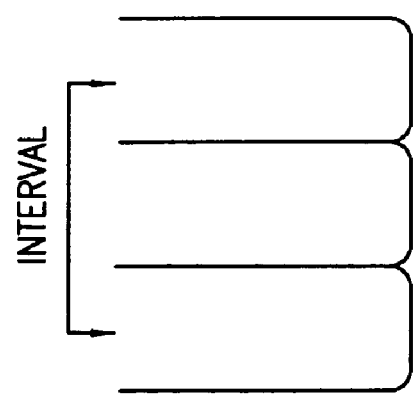
Figure 10:
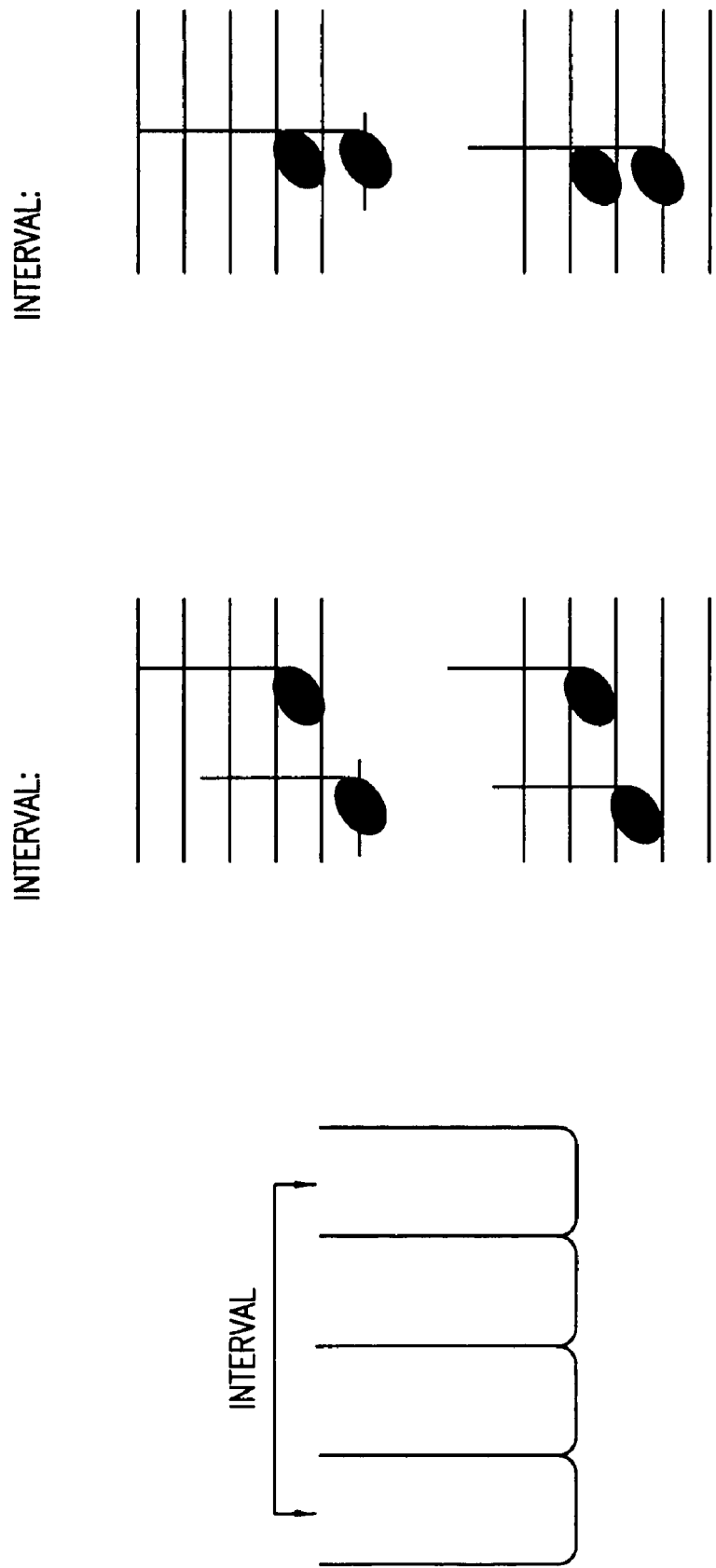
FIG. 10 shows the special relationship between the white keys on a keyboard with the musical notation corresponding to the interval of a "fourth" on a musical score.

In one embodiment of the method of my invention, and with references to FIG. 2 and FIG. 3 the student is taught at the keyboard to (1) finger up the keyboard on two black keys; and (2) finger down the keyboard on two black keys; (3) play two notes constituting the interval of a second at the same time by simultaneously striking two adjacent white keys, repeating the step throughout the length of the keyboard (see FIG. 8); (4) finger up the keyboard from one white note to a second, neighboring white note (seconds) (see FIG. 8); (5) finger down the keyboard from one note, skipping over the adjacent white key to the subsequent white key (thirds) (see FIG. 9); (6) play two notes constituting the interval of a third at the same time by simultaneously striking two white keys separated by one white key, and repeating the step throughout the various points of the keyboard (see FIG. 9); and (7) continue with steps 4 through 6 with $4^{th}$s (see FIG. 10), $5^{th}$s, $6^{th}$s, 7ths and 8ths (octaves).

To facilitate the student's comprehension, my invention contemplates the use of diagrams indicating the relational distances between lines and spaces on the staff and for white keys on the keyboard which constitute the various intervals, as can be seen in FIG. 2.

Although the foregoing description contains many specifics, they should not be construed as limiting the scope of my invention, but rather as merely providing non-limiting illustrations of some of the currently preferred embodiments of the invention as defined in the following claims:

What is claimed is:

1. A method of facilitating the learning of music score reading in the playing of keyboard instruments by imparting to a student an understanding of the relational distance between lines and spaces on a score for white keys on a keyboard and the correlation among the white keys of the keyboard in terms of tone intervals, said white keys being represented by both the lines and spaces of the score, said method comprising the steps of fingering up the keyboard on two black keys;

fingering down the keyboard on two black keys;

playing two notes constituting the interval of a 2nd at the same time by simultaneously striking two adjacent white keys, repeating the step throughout the length of the keyboard, fingering up the keyboard in 2nds from one white note to a second, neighboring white note;

fingering down the keyboard in 3rds from one note, skipping over the adjacent white key to the subsequent white key playing two notes constituting the interval of a third at the same time by simultaneously striking two white keys separated by one white key, and repeating the step throughout the length of the keyboard; and continuing with steps 4 through 6 with respect to 4ths, 5ths, 6ths, 7ths and octaves.

* * * * *